United States Patent
Ceren et al.

(10) Patent No.: US 11,605,100 B1
(45) Date of Patent: Mar. 14, 2023

(54) METHODS AND SYSTEMS FOR DETERMINING CADENCES

(71) Applicant: SalesLoft, Inc., Atlanta, GA (US)

(72) Inventors: Roi Ceren, Alpharetta, GA (US); Scott Mitchell, Smyrna, GA (US); Rob Forman, Atlanta, GA (US)

(73) Assignee: SalesLoft, Inc., Atlanta, GA (US)

( * ) Notice: Subject to any disclaimer, the term of this patent is extended or adjusted under 35 U.S.C. 154(b) by 274 days.

(21) Appl. No.: 15/852,259

(22) Filed: Dec. 22, 2017

(51) Int. Cl.
  *G06Q 30/02*  (2023.01)
  *G06N 20/00*  (2019.01)
  *G06F 16/22*  (2019.01)
  *G06Q 10/10*  (2023.01)
  *G06Q 30/0202*  (2023.01)
  *G06Q 10/107*  (2023.01)

(52) U.S. Cl.
  CPC ..... *G06Q 30/0202* (2013.01); *G06F 16/2246* (2019.01); *G06N 20/00* (2019.01); *G06Q 10/107* (2013.01)

(58) Field of Classification Search
  USPC ...................................................... 705/7.31
  See application file for complete search history.

(56) References Cited

U.S. PATENT DOCUMENTS

| | | | |
|---|---|---|---|
| 7,760,865 B2 | 7/2010 | Awan et al. | |
| 8,064,342 B2 | 11/2011 | Badger | |
| 8,064,582 B2 | 11/2011 | Ma et al. | |
| 8,631,069 B2 | 1/2014 | Maes | |
| 9,256,695 B1 | 2/2016 | Willis et al. | |
| 9,392,122 B2 | 7/2016 | Sall | |
| 9,699,409 B1 | 7/2017 | Reshef et al. | |
| 9,992,448 B2 | 6/2018 | Reshef et al. | |
| 10,181,106 B2 | 1/2019 | Borodow et al. | |
| 10,187,439 B2 | 1/2019 | Ananthanarayanan et al. | |
| 10,218,839 B2 | 2/2019 | Gupta et al. | |
| 10,325,284 B1 * | 6/2019 | Aggarwal | G06Q 30/0242 |
| 10,468,051 B2 | 11/2019 | Godewyn et al. | |
| 10,630,631 B1 | 4/2020 | Yague et al. | |
| 10,708,434 B1 | 7/2020 | Scheet et al. | |
| 10,791,217 B1 | 9/2020 | Bussey | |

(Continued)

OTHER PUBLICATIONS

Vanderveld et al., An Engagement-Based Customer Lifetime Value System for E-commerce, Aug. 2016, KDD '16: Proceedings of the 22nd ACM SIGKDD International Conference on Knowledge Discovery and Data Mining, pp. 293-302 (Year: 2016).*

(Continued)

*Primary Examiner* — Timothy Padot
*Assistant Examiner* — Allison M Neal
(74) *Attorney, Agent, or Firm* — Vorys, Sater, Seymour and Pease LLP (57) ABSTRACT

Methods and systems for determining cadences are described. Behavior information between a user and a potential customer is stored, where the behavior information comprises actions between the user and the potential customer. The behavior information is analyzed to determine an engagement score to represent time effort the potential customer spends in interacting with the user, where the analyzing utilizes model-free reinforcement learning in a generalized Markovian process. A cadence is determined utilizing the engagement score, where the cadence comprises scheduled action items for the user for future interactions with the potential customer.

40 Claims, 4 Drawing Sheets

(56) References Cited

U.S. PATENT DOCUMENTS

| | | |
|---|---|---|
| 11,049,510 B1 | 6/2021 | Wong et al. |
| 11,138,269 B1 | 10/2021 | Sanders et al. |
| 2003/0084107 A1 | 5/2003 | Covey |
| 2007/0206759 A1 | 9/2007 | Boyanovsky |
| 2009/0064323 A1 | 3/2009 | Lin |
| 2009/0209236 A1 | 8/2009 | Bloebaum et al. |
| 2009/0274284 A1 | 11/2009 | Arsenault et al. |
| 2010/0135477 A1 | 6/2010 | Chen |
| 2010/0205543 A1 | 8/2010 | Von Werther et al. |
| 2010/0223389 A1 | 9/2010 | Ananthanarayanan et al. |
| 2010/0296417 A1 | 11/2010 | Steiner |
| 2011/0055379 A1 | 3/2011 | Lin et al. |
| 2011/0228921 A1 | 9/2011 | Singh et al. |
| 2011/0271210 A1 | 11/2011 | Jones et al. |
| 2012/0051267 A1 | 3/2012 | Ma et al. |
| 2012/0137367 A1* | 5/2012 | Dupont .................. G06F 21/00 726/25 |
| 2013/0076853 A1 | 3/2013 | Diao |
| 2013/0191719 A1 | 7/2013 | Underhill et al. |
| 2014/0006611 A1* | 1/2014 | Perez .................. G06F 11/3438 709/224 |
| 2015/0036810 A1 | 2/2015 | Rashid et al. |
| 2015/0149540 A1 | 5/2015 | Barker et al. |
| 2016/0072862 A1 | 3/2016 | Bader-Natal et al. |
| 2016/0212269 A1 | 7/2016 | Backhaus |
| 2016/0253314 A1 | 9/2016 | Pottier et al. |
| 2016/0381215 A1 | 12/2016 | Goyal et al. |
| 2017/0223069 A1 | 8/2017 | Arora et al. |
| 2017/0257598 A1 | 9/2017 | Reshef et al. |
| 2017/0345325 A1 | 11/2017 | Metts |
| 2017/0366621 A1 | 12/2017 | Sagar et al. |
| 2018/0013891 A1* | 1/2018 | Charlson .......... H04M 3/42059 |
| 2018/0082208 A1* | 3/2018 | Cormier .................. G06N 20/00 |
| 2018/0097841 A1* | 4/2018 | Stolarz .................. H04L 51/212 |
| 2018/0121828 A1 | 5/2018 | Keysers et al. |
| 2018/0176661 A1 | 6/2018 | Varndell et al. |
| 2018/0191660 A1 | 7/2018 | Tene et al. |
| 2018/0191901 A1 | 7/2018 | Aleksin et al. |
| 2018/0191907 A1 | 7/2018 | Herrin et al. |
| 2018/0227339 A1 | 8/2018 | Rodriguez et al. |
| 2018/0232705 A1 | 8/2018 | Baker et al. |
| 2018/0239822 A1 | 8/2018 | Reshef et al. |
| 2018/0249007 A1 | 8/2018 | Seward et al. |
| 2018/0249122 A1 | 8/2018 | Reshef et al. |
| 2018/0253215 A1 | 9/2018 | Powell |
| 2018/0268318 A1* | 9/2018 | Matam .................. G06F 40/216 |
| 2018/0330736 A1 | 11/2018 | Faulkner et al. |
| 2019/0042086 A1 | 2/2019 | White et al. |
| 2019/0050376 A1 | 2/2019 | Krebs et al. |
| 2019/0068390 A1 | 2/2019 | Gross et al. |
| 2019/0068526 A1 | 2/2019 | Xie et al. |
| 2019/0102846 A1* | 4/2019 | Loschiavo ............. G06Q 50/16 |
| 2019/0132265 A1 | 5/2019 | Nowak-Przygodzki et al. |
| 2019/0147042 A1 | 5/2019 | Raghavan et al. |
| 2019/0182183 A1 | 6/2019 | Hubauer et al. |
| 2019/0189117 A1 | 6/2019 | Kumar |
| 2019/0205772 A1 | 7/2019 | Kohlmeier et al. |
| 2019/0238354 A1 | 8/2019 | Wiener et al. |
| 2019/0318743 A1 | 10/2019 | Reshef et al. |
| 2019/0341050 A1 | 11/2019 | Diamant et al. |
| 2019/0341054 A1 | 11/2019 | Krupka et al. |
| 2019/0384813 A1 | 12/2019 | Mahmoud |
| 2019/0392395 A1 | 12/2019 | Valliani |
| 2020/0120083 A1 | 4/2020 | Kaladgi et al. |
| 2020/0311195 A1 | 10/2020 | Mishra et al. |
| 2020/0344183 A1 | 10/2020 | Mummidi |
| 2020/0401716 A1 | 12/2020 | Yan et al. |
| 2021/0019739 A1 | 1/2021 | Almonte et al. |
| 2021/0021603 A1 | 1/2021 | Gibbons |
| 2021/0117868 A1 | 4/2021 | Sriharsha |
| 2021/0142180 A1 | 5/2021 | Smith et al. |
| 2021/0157768 A1 | 5/2021 | Silverstein et al. |
| 2021/0003697 A1 | 7/2021 | Zhai et al. |
| 2021/0200612 A1 | 7/2021 | Martyanov |
| 2021/0201003 A1 | 7/2021 | Banerjee et al. |
| 2021/0211447 A1 | 7/2021 | Albero et al. |
| 2021/0233080 A1 | 7/2021 | Shekhar et al. |
| 2021/0234813 A1 | 7/2021 | Narayan et al. |
| 2021/0266345 A1 | 8/2021 | Chen et al. |
| 2021/0303996 A1 | 9/2021 | Chen et al. |
| 2021/0304204 A1 | 9/2021 | Ramesh et al. |
| 2021/0312260 A1 | 10/2021 | Wu et al. |
| 2021/0312395 A1 | 10/2021 | Harsham et al. |
| 2021/0339759 A1 | 11/2021 | Fouad et al. |
| 2022/0067309 A1 | 3/2022 | Sellam et al. |

OTHER PUBLICATIONS

Dredze et al., Automatically Classifying Emails into Activities, ACM (Year: 2006).*

WebEx Meeting Center with Collaboration Meeting Rooms (CMR Cloud) User Guide, https://www.cisco.com/c/en/us/td/docs/collaboration/meeting_center/wbs2913/CMR_Cloud_User_Guide.pdf, total 24 pages, Publication Date: Aug. 1, 2014.

Pexip Mobile App for Android Quick Guide, https://docs.pexip.com/files/v8/Pexip_Mobile_App_Android_Quickguide_v8.a.pdf, Total 4 pages, Publication Date: Feb. 2015.

Lync conference invitations in SIP terms, http://blog.greenl.ee/2011/12/15/lync-conference-invitations/, Total 7 pages, Publication Date: Dec. 15, 2011.

RFC4579—Session Initiation Protocol (SIP) Call Control— Conferencing for User Agents, https://datatracker.ietf.org/doc/rfc4579/ , p. 3, Publication Date: Aug. 2006.

U.S. Appl. No. 16/558,692, filed Sep. 3, 2019, Pending.
U.S. Appl. No. 16/524,653, filed Jul. 29, 2019, Pending.
U.S. Appl. No. 16/558,692.
U.S. Appl. No. 16/524,653.
U.S. Appl. No. 16/518,367.
U.S. Appl. No. 16/518,367, filed Jul. 22, 2019, Pending.
U.S. Appl. No. 16/558,692, filed Sep. 3, 2019, U.S. Pat. No. 10,791,217.
U.S. Appl. No. 16/524,653, filed Jul. 29, 2019. U.S. Pat. No. 10,742,695.
U.S. Appl. No. 16/855,610, filed Apr. 22, 2020, Pending.
U.S. Appl. No. 16/897,846, filed Jun. 10, 2020, Pending.
U.S. Appl. No. 17/206,916, filed Mar. 19, 2021, Pending.
U.S. Appl. No. 16/855,610.
U.S. Appl. No. 16/897,846.
U.S. Appl. No. 17/206,916.
U.S. Appl. No. 17/548,253.

* cited by examiner

METHODS AND SYSTEMS FOR DETERMINING CADENCES

DESCRIPTION OF EMBODIMENTS OF THE INVENTION

Figure 1:
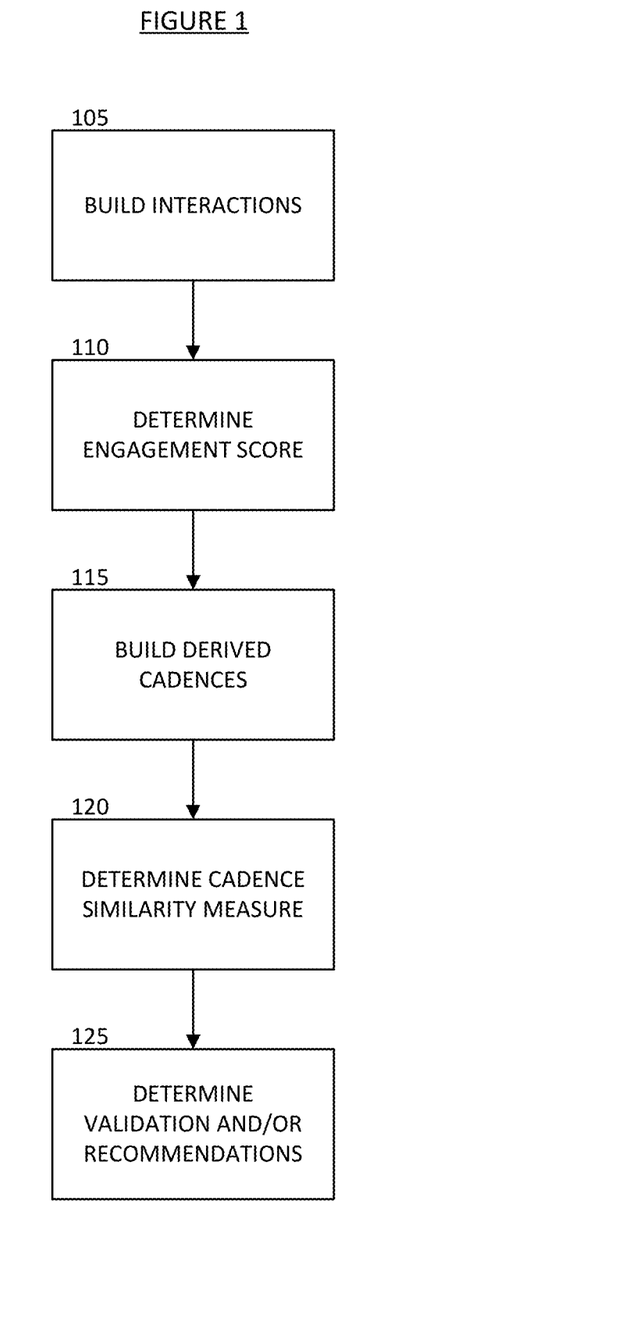
FIG. 1 comprises a method for deriving cadences, according to an embodiment.

FIG. 1 comprises a method for deriving cadences, according to an embodiment. A cadence comprises scheduled action items for the user for future interactions with the potential customer. A cadence can be derived using interactions. In 105, interactions can be built using behavior information between a user (e.g., a salesperson) and a potential customer. The behavior information can comprise actions between the user and the potential customer. In 110, an engagement score can be determined. The engagement score can represent time effort the potential customer spends in interacting with the user. In 115, a derived cadence tree is built. In 120, a cadence similarity measure is determined. In 125, validation and/or recommendations are determined.

Figure 2:
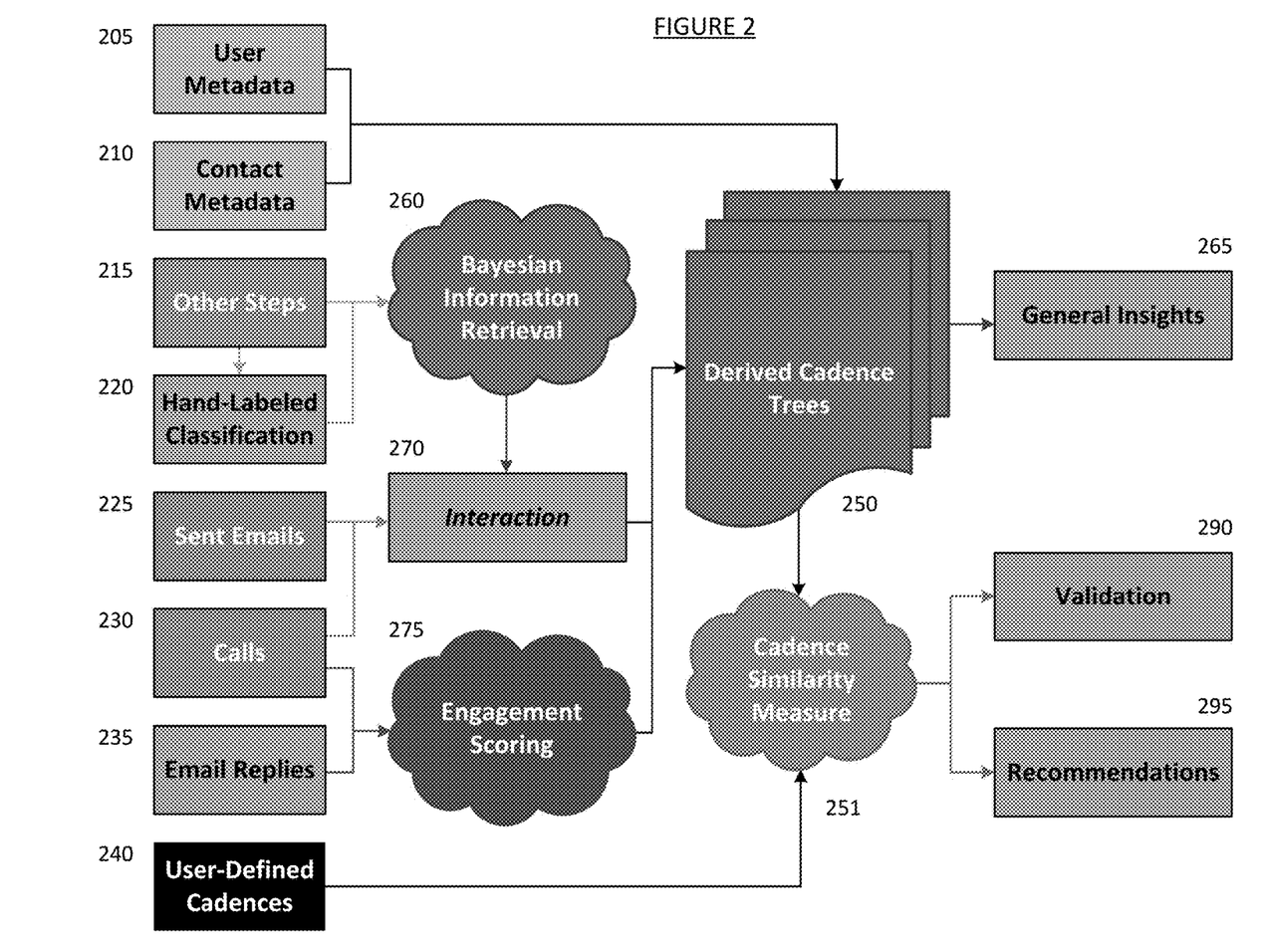
FIG. 2 comprises a derived cadence framework model, according to an embodiment.

FIG. 2 comprises a derived cadence framework model, according to an embodiment. Metadata 205 and contact metadata 210 can be used to determine derived cadence trees 250. Other steps 215 can be used for hand-labeled classification 220, and then other steps 215 and the hand-labeled classification 220 can be used to Bayesian information retrieval 260. Sent emails 225 and calls 230 can be used to determine interactions 270. Calls 230 and email replies 235 can be used to determine the engagement score 275. Sent emails can represent one kind of touch in the interaction sequence structure, which can differ from the replies to those emails, which can establish the level of engagement of a potential customer. Sequences of interactions 270 and an engagement score 275 can be used to determine the derived cadence trees 250. The user-defined cadences 240 and the derived cadence trees 250 can be used to determine the cadence similarity measure 251. The cadence similarity measure 251 can be used for validation 290 and recommendations 295. The derived cadence trees 250 can be used to determine general insights 265.

The described features may be implemented advantageously in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 3:
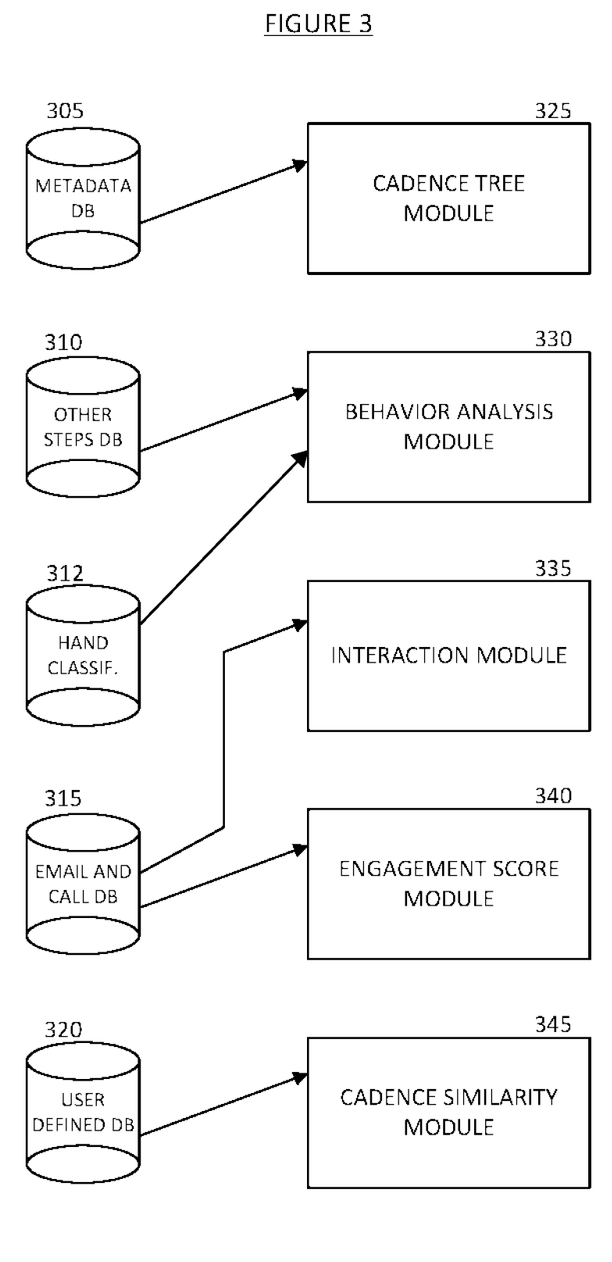
FIG. 3 illustrates a system diagram, according to an embodiment.

FIG. 3 illustrates a system diagram, according to an embodiment. Metadata database 305 can store user metadata and contact data. An example of user metadata is the industry the user belong to. An example of contact metadata includes how many employees the contact's company has. Other steps database 310 can store data related to other steps. Hand-labeled classification database 312 can store classifications that are made by a person. For an example of other steps, and their respective classifications, see Example A. Email and call database 315 can store sent emails and reply emails, and durations of calls. User defined cadence database 320 can store cadence steps, which can be scheduled calls, emails, and other actions, along with what absolute day they are scheduled on. The metadata database 305 can be used in the derived cadence tree module 325 to separate derived cadence trees by metadata. The behavior analysis module 330 can use the other step database 310 in conjunction with hand labeled data 312 to create a discrete set of actions for inclusion in interactions. The interaction module 335 can use the email and call database 315 to create a sequence of interactions, including day and email or call touch type. The engagement score module 340 can use the email and call database 315 to convert reply emails and call duration to score a sequence of interactions. The cadence similarity module 345 can use the user defined cadence database 320 along with a derived cadence to compute a numeric distance between the user defined cadence and derived cadence.

The concepts used in determining the derived cadences and using the derived cadences to scheduled action items for the user for future interactions with the potential customer are set forth in more detail below.

Interaction. An interaction sequence X can be defined as $X=\{<d_0,t_0>,<d_1,t_1>, \ldots <d_z,t_z>\}$ where z is the length of the interaction sequence X, t is a touch (e.g., a call or email), d is the absolute day that t is executed. The absolute day is amount of days transpired since the first day of the sequence of interactions. For example, an interaction where there is a call on the first day, an email on the third day, and a call on the fourth day is defined as $X=\{<1,C>,<3,E>,<4,C>\}$.

Engagement Score. The engagement score ES can be computed, as set forth below:

$$ES(t) = \begin{cases} \frac{\text{length}(t)}{240} & \text{if } t = \text{Email} \\ \frac{\text{duration}(t)}{3.81} & \text{if } t = \text{Call} \end{cases}$$

Length (t) can be the character length of a reply email with the signature and quoted sent email body removed. An example of removing signature and quoted body as well as engagement scoring, of the reply email, is illustrated in Example E. Duration (t) can be the recorded length of a call. Emails can be valued as the time in minutes a contact takes to write a reply, assuming 240 characters per minute. Calls can be valued as the duration of a connected call. The time for an email can be normalized to compare to a call. This can be determined by examining the relationship between the objective day a touch is scheduled on, the touch type, and whether a sales opportunity was marked as won (e.g., Salesforce Opportunity Object defined as Closed and Won). An example function that represents the computation of this ratio is as follows. For this example, assume that the latest defined day in a cadence is 100.

$$\frac{1}{100}\sum_{day=0}^{100} \frac{\frac{1}{|E(day)|}\sum_{email \in E(day)} \text{length}(email)/240}{\frac{1}{|C(day)|}\sum_{call \in C(day)} \text{duration}(call)}$$

where E(day) is the set of emails scheduled for a given day that are associated with a sales opportunity that is closed and won, and C(day) is the set of call durations for calls scheduled for a given day that are associated with a sales opportunity that is closed and won.

Derived Cadence. A derived cadence D can be learned from the interactions, and can have the same structure as a sequence of interactions, including the mean engagement score $\overline{ES}$ and a variance S over the mean engagement score, $D=\{<d_0,t_0,\overline{ES}_0,S_0>,<d_1,t_1,\overline{ES}_1,S_1>, \ldots <d_z,t_z,\overline{ES}_z,S_z>\}$.

Once the mean engagement score and variance are defined, the mean engagement score and variance can be updated with the following function when new information (calls, emails) is introduced:

$$\overline{ES}_n = \overline{ES}_{n-1} + \frac{ES_n - \overline{ES}_{n-1}}{n}$$

where n is the current sample size, $ES_n$ is the engagement score for the nth sample, and $\overline{ES}_n$ is the mean engagement score updated to the nth sample. Once we have the updated mean engagement score, the updated mean variance (e.g., the recurrence) can be computed as:

$$M_n = M_{n-1} + \frac{ES_n - M_{n-1}}{n}$$

$$V_n = V_{n-1} + \frac{ES_n - M_{n-1}}{ES_n - M_n}$$

where the updated mean variance is computed as $$S_n = \frac{V_n}{n-1} \cdot M_0 = ES_0 \text{ and } V_0 = 0.$$

Since recurrence relations $M_n$ and $V_n$ can include previous estimates $M_{n-1}$ and $V_{n-1}$, which fully encapsulate the variance of all samples $ES_0$ to $ES_{n-1}$, it is not required to reinclude the mean engagement score $\overline{ES}_n$. In the variance update, only the most recent sample, $ES_n$ is required. Lastly, the aggregate engagement score of a derived cadence D up to the kth interaction step, where $D(ES_i)$ is the ES of the ith interaction step can then be:

$$\overline{ES}_k(D) = \sum_{i=0}^{k} D(ES_i)$$

and $\overline{ES}(D)=\overline{ES}_z(D)$ where $z=|D|$ is the length of the derived cadence.

Figure 4:
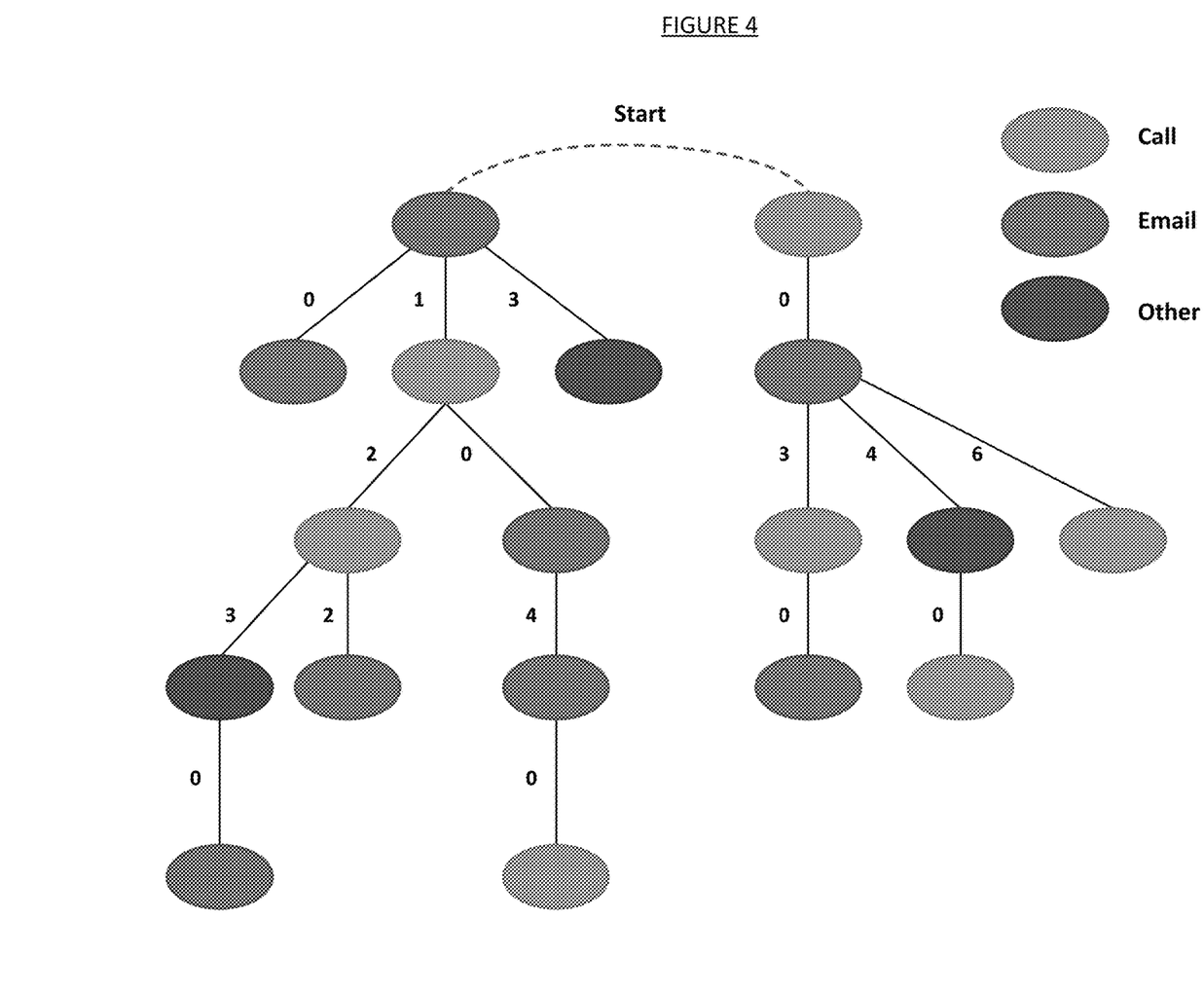
FIG. 4 is an example of a derived cadence tree, according to an embodiment.

Derived Cadence Tree. The space of all computed derived cadences can be represented as a tree because the score for every derived cadence can be conditionally dependent on the sequence of actions up to it (e.g., each step of a derived cadence can be only affected by what happens before it). All similar derived cadences can be collapsed to the same branch of the tree, and fork when subsequent steps deviate between them. FIG. 4 is an example, according to an embodiment of the invention. One example set of derived cadences that may generate the example in FIG. 4 appears as follows.

DC 1: {<0,E,0.12,0.05>,<0,E,0.81,0.11>}
DC 2: {<0,E,0.12,0.05>,<1,C,1.31,0.27>,<3,C,1.21,0.7>, <6,0,0,0>,<6,E,2.51,0.6>}
DC 3: {<0,E,0.12,0.05>,<1,C,1.31,0.27>,<3,C,1.21,0.7>, <5,E,1.05,0.31>}
DC 4: {<0,E,0.12,0.05>,<1,C,1.31,0.27>,<1,E,0.55,0.12>, <5,E,1.21,0.33>,<5,C,3.12,0.9>}
DC 5: {<0,C,0.03,0.012>,<0,E,2.13,0.19>,<3,C,4.12,1.2>, <3,E,0.59,0.13>}
DC 5: {<0,C,0.03,0.012>,<0,E,2.13,0.19>,<4,0,0,0>,<4,C, 3.11,0.89>}
DC 5: {<0,C,0.03,0.012>,<0,E,2.13,0.19>,<6,C,3.61, 1.13>}

Ingesting Interaction into Derived Cadence Tree. Before ingesting a sample interaction sequence X into the derived cadence framework, the sample can be shortened to exclude any events that occur after engagement has already been established. This can be done by: (1) removing anything after a user marks a contact a "success", and/or (2) eliminating any activity following a disproportionate increase in the engagement score for that day. When both (1) and (2) are used, the earliest point of elimination can be used.

A user may mark a contact or a touch as a success, where success is contextual to the goals of the user and is unknown to the system. However, a success is always associated with accomplishing the purpose of a cadence, and is thus an indicator of engagement. The purpose and use of the "success" button, which is how a user marks a success, is described in the SalesLoft blog post "It's Go Time: 9 Features in 7 Days" found at www.salesloft.com.

Eliminating any activity following a disproportionate increase in the ES for the day can involve computing the average slope of change for an ES. For example, where X is the set of all interaction sequences, Z is a subset of the total interaction sequences, and p is a single step in an interaction sequence, the subset of the whole corpus that contains a step on specific day d can be defined as $$\vec{X}_d = (x | x \in X \wedge \exists \phi \cdot (\phi \in x \wedge d \in \phi))$$

That is, $\vec{X}_d$ is the subset of interaction sequences within the total set that satisfy the requirement of a touch being executed on day d. Let $\vec{X}_d^k$ be the kth interaction sequence of the set. Lastly, let the function for accessing a value $v \in \{d, t, ES\}$ in the kth interaction sequence be $\vec{X}_d^k(v)$. For example, accessing the engagement score follows the notation $\vec{X}_d^k(ES)$. $I(a,b)$ is an indicator function returning 1 when $a=b$ and 0 otherwise. And the average change in engagement score is then $$\widehat{ES}(d) = \sum_{k=0}^{|\vec{X}_d|} \sum_{i=1}^{|\vec{X}_d^k|} I(\vec{X}_d^k(d), d) \left( \frac{\vec{X}_d^k(ES) - \vec{X}_d^{k-1}(ES)}{|\vec{X}_d| \cdot \vec{X}_d^{k-1}(ES)} \right)$$

Specifically, the above formula can compute the slope change of the ES of the interaction step where the specific day occurs compared to the step that precedes it, and then can average it across the entire set.

$S\widehat{ES}^{(d)}$ is the variance of the above computation.

For each sequence of interactions, if any of the steps can satisfy the following expression, for the kth step of the interaction, where $0<k\leq z$ and $d_k$ is the day of the kth interaction:

$$\frac{ES_k - ES_{k-1}}{ES_{k-1}} \geq \widehat{ES}(d_k) + 3\sqrt{S\widehat{ES}^{(d_k)}}$$

then the earliest kth element that satisfies it can then made the last step of the interaction, and all following steps can then be discarded.

Other Steps Labels. Several labels can be created for other steps. For example, a person can create the following labels
Research
Move to Another Cadence
Find Another Person
Handwritten Note
Send Swag
SMS Text
Unknown
Twitter/Social
Verify/Dedup contact info
LinkedIn Connection Request
LinkedIn InMail
Comment on LinkedIn Post
Visit LinkedIn Profile These labels may be decided by selecting common use cases for other actions then emails and calls that are used in pursuing a sales engagement.

Multiple other step labels can also be created. Once the labels have been created, the name and description of another step can be examined using the labels. Then, a Bayesian bag-of-words model for each word in the other step can be learned, depreciating the weight of that word sample based on how large the other step's name and description were. See Example A for how the words in a set of other step may be associated with the above example labels, and how the word scores then influence labeling unlabeled other steps.

Closest Derive Cadence. In order to see the score for a derived cadence not yet seen (or if there is not enough information about the derived cadence), the closest derived cadences in the derived cadence tree can be found, and the approximate score of the unknown derived cadence can be proportionally weighed based on how far all its "neighbors" are. The set of "neighbor" derived cadences can be generated by checking to see if any derived cadence exists that differs by a single event, where that event differs by touch and/or up to five days prior or after the original schedule.

---

Algorithm 1 nbr($\mathcal{O}$): Generate neighborhood

Require: Origin day-touch set $\mathcal{O}$
1: $\vec{\mathcal{N}} \leftarrow \emptyset$
2: for $\{d_k, t_k\} \in \mathcal{O}$ Do
3: $\quad p \leftarrow -\infty$
4: $\quad q \leftarrow \infty$
5: $\quad$ if $k > 0$ then
6: $\quad\quad p \leftarrow d_{k-1}$
7: $\quad$ if $k < |\mathcal{O}|$ then
8: $\quad\quad q \leftarrow d_{k+1}$ -continued Algorithm 1 nbr($\mathcal{O}$): Generate neighborhood 9:  for i ∈ {max[p, d − 5], min[q, d + 5]} do
10:   if i ≠ d then
11:    $\vec{\mathcal{N}} \leftarrow \vec{\mathcal{N}} \cup (\mathcal{O} - \langle d_k, t_k \rangle) + \langle i, t \rangle$
12:   if t = Email then
13:    $\vec{\mathcal{N}} \leftarrow \vec{\mathcal{N}} \cup (\mathcal{O} - \langle d_k, t_k \rangle) + \langle i, \text{Call} \rangle$
14:   if t = Call then
15:    $\vec{\mathcal{N}} \leftarrow \vec{\mathcal{N}} \cup (\mathcal{O} - \langle d_k, t_k \rangle) + \langle i, \text{Email} \rangle$
16:  return $\vec{\mathcal{N}}$ We can define a neighborhood as the set of cadences N that differ from an original cadence, defined by a set of touches O, by a single day-touch pair, to a maximum of 5 days different than the original schedule. We can exclude engagement scores, allowing comparison between cadences and DCs. Line 2 can iterate over all day-touch tuples in the origin, exploring neighbors up to 5 days earlier or later. Lines 6 and 8 can ensure the transformation for a day is bound by the scheduled touches before and after it. Every neighbor that differs by this range, and those that differ by the touch defined on that day, can be added.

Distance between derived cadences can be computed by taking the minimum difference of every combination of events in the derived cadence that are not identical. The difference computed in each combination can be the aggregate of the difference in what day the event was scheduled on, and squared if the touch type was different.

As a first step, we can eliminate all day-touch pairs from the origin and neighbor that are identical on lines 2 and 3. Next, lines 4 and 5 can extract every combination of steps within each set, limited to a subset the size of the smallest original excluded set. Line 6 can then explore the Cartesian product of these steps, with the goal of identifying the lowest-distance combination of the subsets. Line 7 can get the cost of the excluded day-touch pairs from whichever set, origin or neighbor, is longer. The subsequent loop can explore the pairs in the joint set and can apply a cost function that sums the day difference and, if the touches differ, doubles the cost. Lastly, if a new minimum pairing has been found, the distance can be updated in line 13 Since this only produces transformations on a single day-touch tuple, the method may be nested to produce multiple transformations, at the increased expense of a much larger local neighborhood.

Determine Approximate Score. Given the neighborhood and the distances between the unknown cadence and the known derived cadence neighbors, the approximate score can be computed as follows:

$$\overline{ES}(O) = \frac{\sum_{N \in nbr(O)} \overline{ES}(N) \cdot w(O, N, nbr(O))}{\sum_{N \in nbr(O)} w(O, N, nbr(O))}$$

where $\overline{ES}(O)$ is the approximate engagement score for an unknown cadence O, nbr(O) is defined in Algorithm 2, and $\overline{ES}(N)$ is the aggregate engagement score of known neighbor N. Additionally, weight function $w(O, N, \vec{N})$, where N is a neighborhood, is defined as $$w(O, N, \vec{N}) = 1 + \max_{N_i \in \vec{N}} dist(O, N_i) - dist(O, N)$$

A detailed example of approximate engagement scoring of unscored cadences is defined in Example D.

Examples

We begin with an example of Other step classification, to show how we can arrive at a discrete action for an arbitrary Other step name and description, given a corpus of hand-labeled samples. We then proceed by defining a corpus of interactions and illustrate how the DC engine computes unique Derived Cadences from the examples. We show how it is then compressed into a DC tree. Given some constraints, we then show how it selects high-value DCs.

Each example in this appendix is toy by design. The modules in the DC engine are designed to cope with scale, trading off potential accuracy loss for computability in reasonable time.

A. Other Step Classification

Take three example Other steps, with associated defined labels. We illustrate classification by creating a low-sample Bayesian classifier using these three, and show how the system then classifies a previously unseen Other step.

Other Step #1
Name: Marketing Nurture
Description: If not disqualified, move to marketing Cadence
Hand Classification: Move to Another Cadence (Label A)
Other Step #2
Name: LI
Description: Send LinkedIn message
Hand Classification: Linked/n InMail (Label B)
Other Step #3
Name: Social Step #1
Description: Send a social message or a tweet
Hand Classification: Twitter/Social (Label C)

After reading the above samples, the classifier learns the following relationships. For brevity, we use A, B, and C to refer to Move to Another Cadence, Linked/n InMail, and Twitter/Social respectively. The form of the below dictionary is name: (class, probability, weight [; class, probability, weight . . . ])

marketing: (A, 100%, ⅓)
nurture: (A, 100%, ⅙)
disqualified: (A, 100%, ⅙)
move: (A, 100%, ⅙)
cadence: (A, 100%, ⅙)
li: (B, 100%, ¼)
send: (B, 50%, ¼; C, 50%, ⅙)
linkedin: (B, 100%, ¼)
message: (B, 50%, ¼; C, 50%, ⅙)
social: (C, 100%, ⅓)
step: (C, 100%, ⅙)
tweet: (C, 100%, ⅙)

As a result, here is the classification for another Other step, based on this model.

Classified Other Step
Name: LIM
Description: Send a message on LinkedIn

Class Proportions: A=0; B=(0.5*¼+0.5*¼+1*¼)=½; C=(0.5*⅙+0.5*⅙)=⅙

Classifier Selection: Linked/n InMail

B. Converting Interactions to DCs with Engagement Scoring

We begin with a single series of interactions. Between one user and their contact, consider the following behavior followed by the user.

Day 1: Email
Day 4: Call
Day 5: LinkedIn InMail (LIM)
Day 7: Call
Day 7: Email

Using the notation in the paper On Deriving Optimal Cadences via Engagement Score Maximization, we define this series of interactions as:

{<1,E>,<4,C>,<5,LIM>,<7,C>,<7,E>}

Let's say that the contact replied to the first and second call, and the second email (days 4 and 7). An example description of the hypothetical interactions from the perspective of the contact looks like this:

Day 1: No reply
Day 4: 1 minute call
Day 7: 4 minute call
Day 7: 500 character email when salutation, signature, and quoted original email is removed We then illustrate the scored series of interactions as the following tuple, when using the Engagement Score conversion specified in Eq. 1 of the paper.

{<1,E,0,0>,<4,C,15.748,0>,<5,LIM,0,0>,<7,C,62.99,0>, <7,E,2.08,0>}

If this was the only example of the above structure, the series of interactions would be the current version of the associated DC, albeit with very low confidence. To illustrate the update mechanism for Engagement Score, we examine the call on day 4. Let's say the associated DC to the above structure looks like this:

{<1,E,0.15,0.02>,<4,C,0.12,0.05>,<5,LIM,0,0>,<7,C, 1.9,0.19>,<7,E,1.13,0.22>}

For our example, we'll just update the second element (the call on day 4), though in practice we would every element. In order to update the mean and variance, we require the last computed mean, the last sample's Engagement Score, the current Engagement Score, and the last variance and its recurrence relation M. Let's assume that the 4th day call has 99 samples using the following values for the parameters in the mean and variance update:

$ES_{99}=2.1$
$ES_{99}=0.12$
$S_{99}=0.05$
$M_{99}=0.18$

We then compute the updated mean as $$\overline{ES}_{100} = 0.12 + \frac{15.748 - 2.1}{100} = 0.256$$

Variance is then updated as $$M_{100} = 0.18 + \frac{31.49 - 0.18}{100} = 0.4931$$

$$S_{100} = 0.05 + \frac{31.49 - 0.18}{31.49 - 0.4931} \approx 1.06$$

Therefore, after we update the interaction on the 4th day, but before any other interaction, the original DC becomes

{<1,E,0.15,0.02>,<4,C,0.256,1.06>,<5,LIM,0,0>,<7,C, 1.9,0.19>,<7,E,1.13,0.22>}

If you apply the same update to every interaction using the above method, depending on the previous sample sizes for each interaction and their respective last sample's Engagement Scores, a possible updated DC looks like:

{<1,E,0.14,0.019>,<4,C,0.256,1.06>,<5,LIM,0,0>,<7,C, 2.1,1.8>,<7,E,1.33,0.21>}

C. Pruning Interactions

One method for removing steps of an interaction is to remove all steps following the timestamp that a user presses the SalesLoft "Success" button. In the paper, we present an alternative method: when the Engagement Score delta between two steps exceeds our expected amounts. We will use the ES gradient between the calls on Day 4 and 7 as an example here.

First let's see the bound on Engagement Score for pruning in action. Imagine we have four small examples. Note that the variance is 0 in each of these examples because they are individual interactions, not aggregated Derived Cadences.

{<1,E,1.21,0>,<7,E,6.1,0>}
{<1,E,0,0>,<3,E,2.2,0>,<7,C,12.1,0>}
{<1,E,0,0>,<3,E,1.2,0>,<3,C,2.13,0>,<7,C,0,0>}
{<1,E,5.1,0>,<C,E,0,0>,<6,C,4.13,0>,<7,C,9.1,0>}

The computation for expected Engagement Score slope would then be:

$$\frac{1}{4}\left(\frac{6.1 - 1.21}{1.21} + \frac{12.1 - 2.2}{2.2} + \frac{0 - 2.13}{2.13} + \frac{9.1 - 4.13}{4.13}\right) =$$

$$\frac{1}{4}(4.041 + 4.5 - 1 + 1.203) = 2.186$$

with a variance S=6.638, which is high due to the low sample size. In order to prune, then, the 7th day Call must satisfy the bound.

$$\frac{62.99 - 15.748}{31.49} \geq 2.186 + 3\sqrt{6.638}$$

which does not satisfy the bound. Imagine, however, after 1,000 samples, the variance drops to S=0.07, a highly confidence result, but the mean remains the same. Then the equivalence would become $$3 \geq 2.186 + 0.794$$

Since this equivalence is true, we would include only up to the 7th day Call, and eliminate the final email.

{<1,E,0.15,0.02>,<4,C,0.256,1.06>,<5,LIM,0,0>,<7,C, 1.9,0.19>}

D. Finding Cadence Neighbors, Scoring Distances, and Computing Approximate Score Here we illustrate the creation of local neighbors for a given Cadence. Take the following small Cadence definition.

{<1,E>,<3,C>,<4,C>}

The first day is a fixed day value, since a Cadence that does not begin on Day 1 is nonsensical. However, a different touch may be considered. Following Alg. 1 in the paper, we generate the following neighborhoods. We first show the combination of touch transformations while maintaining the same days.

{<1,C>,<3,C>,<4,C>}
{<1,E>,<3,E>,<4,C>}
{<1,E>,<3,C>,<4,E>}

We can also transform the day on the second day-touch tuple, and examine the touch transformation therein.

{<1,E>,<1,C>,<4,C>}
{<1,C>,<1,E>,<4,C>}

We repeat transformations for the day set in the second tuple as 2 and 4, where 4 is the bound due to the third tuple.

{<1,E>,<4,C>,<4,C>}
{<1,C>,<4,E>,<4,C>}

The third tuple's day is bound by [3, 9], excluding the original day 4, which we illustrate with brevity in mind here:

{<1,E>,<3,C>,<3,C>}
{<1,C>,<3,C>,<3,E>}
. . .
{<1,E>,<3,C>,<9,C>}
{<1,E>,<3,C>,<9,E>}

Even for this very small example, we have a total local neighborhood of 21 possible Derived Cadences. However, note that not all of these neighbors may exist in the compiled DC tree. For the purposes of this example, we'll assume only one of the neighbor Cadences has a DC with the same structure and compute its distance as in Alg. 2.

O={<1,E>,<3,C>,<4,C>}
N={<1,E>,<3,C,<7,E>}

The first step is to eliminate tuples that are at the intersection of the sets. Simply, this should leave the tuple

O⁻={<4,C>}
N⁻={<7,E>}

Since we only have one tuple in the resulting excluded intersection, only one combination of the two sets exists. This is usually the case, but Alg. 1 may be called iteratively on the local neighborhood to expand it, resulting in multiple differing day-touch tuples. This is done when the first pass of Alg. 1 results in no neighbors being found in the DC Tree.

Since the resulting sets being compared are the same size, Line 7 in Alg. 2 is 0. Since N⁻ has a touch 3 days after the compared touch in O⁻, and the touches are of different types, Line 12 results in a distance of 8.

For computing the approximate score of the origin Cadence O, let's add a few neighbor DCs and their associated Engagement Scores and distances.

O={<1,E>,<3,C>,<4,C>}
N₁={<1,E>,<3,C>,<7,E>};dist(O,N)=8; $\overline{ES}(N)$=5.8
N₂={<1,E>,<3,C>,<6,C>};dist(O,N)=2; $\overline{ES}(N)$=12
N₃={<1,E>,<4,E>,<4,C>};dist(O,N)=4; $\overline{ES}(N)$=3.8

According to Eq. 3, the resulting approximate Engagement Score is:

$$\overline{ES}(O) = \frac{5.8 + 12 \cdot 7 + 3.8 \cdot 3}{11} = \frac{101.2}{11} = 9.2$$

E. Reply Email Processing

Consider a reply email as follows.
Hello Tim,
I would love to meet this afternoon.
Thanks!
--
Brenda
Sales Operations
brenda@example.com On Jan. 1, 2017 at 12:00 PM, Tim <tim@user.com> wrote:
Hey Brenda,
Would you like to meet soon for a demo?
Tim The reply with signature and quoted email reply removed is illustrated as follows.
Hello Tim,
I would love to meet this afternoon.
Thanks!

The engagement score for this short email would resolve to $$ES(t) = \frac{10}{240} \approx 0.04.$$

CONCLUSION

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer-implemented method comprising:
monitoring behavioral interaction information between a user and a potential customer, using a processor, the behavioral interaction information comprising interactions between the user and the potential customer, the interactions including emails, calls, and other interaction steps,
storing, using the processor, the behavioral interaction information on a data storage system, wherein the storing includes storing sample data relating to the other interaction steps and labels associated with classifications of the respective other interaction steps;
creating, using the processor, a Bayesian classifier model using the stored sample data and labels;
analyzing the behavioral interaction information, using the processor coupled to the data storage system, to determine an engagement score to represent time effort the potential customer spends interacting with the user, wherein the engagement score is calculated using the processor by:
   using character length information for emails and recorded duration information for calls to determine the engagement score, and
   normalizing the recorded duration information for the calls by using a set of emails scheduled for a given day that are associated with a sales opportunity and a set of recorded call durations for calls scheduled for a given day that are associated with a won sales opportunity;
determining, using the processor, a user's cadence utilizing the engagement score, the user's cadence comprising scheduled interaction items for the user for future interactions with additional potential customers;
utilizing a user's cadence's engagement score and computational statistics to derive, using the processor, neighboring derived cadences, the computational statistics comprising recurrence relationship information, and the neighboring derived cadences comprising sequences of behavioral interactions similar to the scheduled interaction items in the user's cadence;
determining, using the processor, engagement scores for the neighboring derived cadences representing a likelihood that the neighboring derived cadences will result in a potential customer engagement;
utilizing the engagement scores for the neighboring derived cadences, using the processor, to make recommendations to optimize the user's cadence in order to optimize interactions between the user and future potential customers, wherein the neighboring derived cadences are represented as a derived cadence tree because the engagement score for every derived cadence is conditionally dependent on a previous sequence of actions;
applying, using the processor, the Bayesian classifier model to input data representative of other interaction steps to obtain classification information for the other interaction steps; and
adding, using the processor, the obtained classification information for the other interaction steps to the derived cadence tree.

2. The computer-implemented method of claim 1, wherein email time comprises an amount of time to prepare and send an email multiplied by a differential multiplier.

3. The computer-implemented method of claim 2, wherein the differential multiplier is 3.81.

4. The computer-implemented method of claim 1, wherein email time or call time is mapped to a real number.

5. The computer-implemented method of claim 1, wherein calls and emails are weighted disproportionately.

6. The computer-implemented method of claim 5, wherein emails are weighted higher than calls.

7. The computer-implemented method of claim 1, wherein the labels for the other interaction steps identify an action regarding a text message, social media message, or social media post.

8. The computer-implemented method of claim 7, wherein the applying, using the processor, the Bayesian classifier model includes analyzing descriptive words in the input data according to class, probability and weight to obtain the classification information for an identified action.

9. The computer-implemented method of claim 1, wherein the sequences of behavioral interactions are compared to each other to determine a cadence similarity measure.

10. The computer-implemented method of claim 9, wherein the cadence similarity measure comprises:
   generating structurally similar cadences to a given cadence; and
   determining distance between a cadence and its structurally similar cadences.

11. The computer-implemented method of claim 1, wherein the behavioral interaction information is modeled as the derived cadence tree, the derived cadence tree comprising nodes and edges connecting the nodes, wherein the edges represent a time observed between two interactions, or wherein the nodes represent interactions.

12. The computer-implemented method of claim 11, wherein a node has attributes comprising engagement score, interaction, or engagement score variance, or any combination thereof.

13. The computer-implemented method of claim 12, wherein the derived cadence tree is searched.

14. The computer-implemented method of claim 13, wherein the derived cadence tree is searched using constraints.

15. The computer-implemented method of claim 14, wherein the constraints comprise node information or edge information.

16. The computer-implemented method of claim 1, further comprising:
   determining a closest neighboring derived cadence to the interactions between the user and the potential customer using the derived cadence tree.

17. The computer-implemented method of claim 1, wherein the neighboring derived cadences comprise derived cadences that differ from the interactions between the user and the potential customer by a single interaction.

18. The computer-implemented method of claim 17, further comprising:
   determining distances between the interactions between the user and the potential customer and the neighboring derived cadences by determining a minimum difference between every combination of interactions in a neighboring derived cadence that is not identical to a combination of interactions between the user and the potential customer; and
   weighing the engagement scores for the neighboring derived cadences based on the distance between the interactions between the user and the potential customer and the neighboring derived cadences.

19. The computer-implemented method of claim 18, further comprising: calculating weighed engagement scores for neighboring derived cadences.

20. The computer-implemented method of claim 19, further comprising: using cadence similarity measures are used for recommendations.

21. The computer-implemented method of claim 17, the single interaction comprising a touch or a pre-determined amount of time.

22. The computer-implemented method of claim 21, the touch comprising an email, a call, or another step.

23. The computer-implemented method of claim 18, wherein the engagement score is an approximation score.

24. The computer-implemented method of claim 1, wherein all similar derived cadences are collapsed to a same branch of the derived cadence tree, and fork when subsequent steps deviate between them.

25. The computer-implemented method of claim 1, wherein before ingesting a sample interaction sequence into a derived cadence framework, the sample interaction sequence is shortened to exclude any events that occur after engagement has been established.

26. The computer-implemented method of claim 25, wherein the sample interaction sequence is shortened by:
removing anything after a user marks a contact a success; or
eliminating an activity following a disproportionate increase in the engagement score for that day; or both.

27. The computer-implemented method of claim 26, wherein when the sample interaction sequence is shortened by removing any activity after a user marks a contact a success and also eliminating an activity following a disproportionate increase in the engagement score for a day, an earliest point of elimination is used.

28. The computer-implemented method of claim 1, wherein a closest derived cadence in the derived cadence tree is found and an approximate score of an unknown derived cadence is proportionally weighed based on how far apart unknown derived cadence neighbors are from other cadence neighbors.

29. The computer-implemented method of claim 28, wherein the unknown derived cadence neighbors are found by determining if any derived cadence exists that differs by a single event.

30. The computer-implemented method of claim 29, wherein the single event differs by touch or up to five days prior or after an original schedule.

31. The computer-implemented method of claim 30, wherein day-touch tuples in an origin are iterated, and the unknown derived cadence neighbors up to five days earlier or later are explored.

32. A system comprising:
a processor configured to monitor behavioral interaction information between a user and a potential customer, the behavioral interaction information comprising interactions between the user and the potential customer, the interactions including emails, calls, and other interaction steps; and
a data storage system, coupled to the processor, configured to store the behavioral interaction information, including sample data relating to the other interaction steps and labels associated with classifications of the respective other interaction steps;
wherein the processor is further configured to:
create a Bayesian classifier model using the stored sample data and labels;
analyze the behavioral interaction information to determine an engagement score to represent time effort the potential customer spends in interacting with the user, and wherein the engagement score is calculated:
using character length information for the emails and recorded duration information for the calls to determine the engagement score, and
normalizing the recorded duration information for the calls by using a set of emails scheduled for a given day that are associated with a sales opportunity and a set of recorded call durations for calls scheduled for a given day that are associated with a won sales opportunity;
determine a user's cadence utilizing the engagement score, the user's cadence comprising scheduled interaction items for the user for future interactions with additional potential customers;
utilize a user's cadence's engagement score and computational statistics to derive, using the processor, neighboring derived cadences, the computational statistics comprising recurrence relationship information, and the neighboring derived cadences comprising sequences of behavioral interactions similar to the scheduled interaction items in the user's cadence;
determine engagement scores for the neighboring derived cadences representing a likelihood that the neighboring derived cadences will result in a potential customer engagement;
utilize the engagement scores for the neighboring derived cadences to make recommendations to optimize the user's cadence in order to optimize interactions between the user and future potential customers, wherein the neighboring derived cadences are represented as a derived cadence tree because the engagement score for every derived cadence is conditionally dependent on a previous sequence of actions;
apply the Bayesian classifier model to input data representative of other interaction steps to obtain classification information for the other interaction steps; and
add the obtained classification information for the other interaction steps to the derived cadence tree.

33. The system of claim 32, wherein email time comprises an amount of time to prepare and send an email multiplied by a differential multiplier.

34. The system of claim 33, wherein the differential multiplier is 3.81.

35. The system of claim 32, wherein the behavioral interaction information is modeled as the derived cadence tree, the derived cadence tree comprising nodes and edges connecting the nodes, wherein the edges represent a time observed between two interactions, or wherein the nodes represent interactions.

36. The system of claim 35, wherein a node has attributes comprising engagement score, interaction, or engagement score variance, or any combination thereof.

37. The system of claim 36, wherein the derived cadence tree is searched.

38. The system of claim 37, wherein the derived cadence tree is searched using constraints comprising node information or edge information.

39. The system of claim 32, wherein the labels for the other interaction steps identify an action regarding a text message, social media message, or social media post.

40. The system of claim 39, wherein the processor is configured to apply the Bayesian classifier model to analyze descriptive words in the input data according to class, probability and weight to obtain the classification information for an identified action.

* * * * *